United States Patent
Kim

(10) Patent No.: US 10,513,618 B2
(45) Date of Patent: Dec. 24, 2019

(54) COMPOSITION FOR FORMING A HARD COATING LAYER HAVING EXCELLENT ANTI-FOULING PROPERTY

(71) Applicant: Chang Kyun Kim, Sejong-si (KR)

(72) Inventor: Chang Kyun Kim, Sejong-si (KR)

( * ) Notice: Subject to any disclaimer, the term of this patent is extended or adjusted under 35 U.S.C. 154(b) by 0 days.

(21) Appl. No.: 15/828,115

(22) Filed: Nov. 30, 2017

(65) Prior Publication Data

US 2019/0119506 A1    Apr. 25, 2019

(30) Foreign Application Priority Data

Oct. 20, 2017   (KR) .................. 10-2017-0136435

(51) Int. Cl.
| | |
|---|---|
| *C09D 5/16* | (2006.01) |
| *C09D 7/20* | (2018.01) |
| *C09D 183/08* | (2006.01) |
| *C01G 23/047* | (2006.01) |
| *B32B 27/28* | (2006.01) |
| *B32B 27/18* | (2006.01) |
| *C01G 25/02* | (2006.01) |
| *C09D 7/61* | (2018.01) |
| *C09D 5/00* | (2006.01) |
| *C08K 3/22* | (2006.01) |

(52) U.S. Cl.
CPC ............ *C09D 5/1681* (2013.01); *B32B 27/18* (2013.01); *B32B 27/283* (2013.01); *C01G 23/047* (2013.01); *C01G 25/02* (2013.01); *C09D 5/00* (2013.01); *C09D 7/20* (2018.01); *C09D 7/61* (2018.01); *C09D 183/08* (2013.01); *B32B 2307/536* (2013.01); *B32B 2307/584* (2013.01); *C01P 2004/64* (2013.01); *C08K 2003/2241* (2013.01); *C08K 2003/2244* (2013.01)

(58) Field of Classification Search
CPC .......... C09D 5/1681; C09D 7/61; C09D 7/20; C09D 5/00; C09D 183/08; B32B 27/18; B32B 27/283; C01G 23/047; C01G 25/02
See application file for complete search history.

(56) References Cited

U.S. PATENT DOCUMENTS

| | | | |
|---|---|---|---|
| 2007/0190308 A1* | 8/2007 | Brand | B05D 5/00 428/323 |
| 2009/0075093 A1* | 3/2009 | Iversen | C03C 17/006 428/432 |
| 2012/0156893 A1* | 6/2012 | Ozaki | C23C 18/1208 438/781 |

(Continued)

*Primary Examiner* — Melvin C. Mayes
*Assistant Examiner* — Michael Forrest
(74) *Attorney, Agent, or Firm* — Novick, Kim & Lee, PLLC; Sang Ho Lee

(57) ABSTRACT

Provided is a composition for forming a hard coating layer including about 0.1 wt % to about 15 wt % of a polysilazane, about 55 wt % to about 94.6 wt % of a reactive solvent containing hydroxyl group, about 5 wt % to about 20 wt % of a titanium dioxide ($TiO_2$), and about 0.3 wt % to about 10 wt % of a zirconia ($ZrO_2$). The composition provides a hard coating film which has excellent anti-fouling and superhydrophilicity, scratch resistance, abrasion resistance, antimicrobial property, weatherability, and a method for manufacturing the same which allow non-vacuum wet coating, thereby shortening fabrication time and providing excellent processability.

8 Claims, 3 Drawing Sheets

(56) References Cited

U.S. PATENT DOCUMENTS

| | | | |
|---|---|---|---|
| 2013/0196140 A1* | 8/2013 | Lewis | B32B 3/10 |
| | | | 428/312.6 |
| 2013/0250425 A1* | 9/2013 | Pett | G02B 1/12 |
| | | | 359/614 |
| 2015/0060444 A1* | 3/2015 | Wang | B65D 23/0814 |
| | | | 220/62.11 |

* cited by examiner

COMPOSITION FOR FORMING A HARD COATING LAYER HAVING EXCELLENT ANTI-FOULING PROPERTY

CROSS-REFERENCE TO RELATED APPLICATION

This application claims the priority benefit of Korean Patent Application No. 10-2017-0136435 filed on Oct. 20, 2017, in the Korean Intellectual Property Office, the disclosure of which is incorporated herein by reference.

BACKGROUND

1. Field of the Invention

Present invention relates to a composition for forming a hard coating layer having excellent anti-fouling property and a hard coating film prepared therefrom.

2. Related Art

Generally, a composition for forming a hard coating layer is used to protect the surface of a material having poor scratch resistance and abrasion resistance in order to maintain the appearance.

The composition for forming a hard coating layer can be applied to glass material such as an automobile windshield, a side mirror, a construction glass, and the like.

To improve scratch resistance and abrasion resistance, various attempts have been made to form a silica film as a hard coating layer on a substrate through plasma enhanced chemical vapor deposition (PECVD), CVD, sputtering, a sol-gel process, and the like. However, when PECVD, CVD or sputtering is used, there is a problem in that an apparatus for PECVD, CVD or sputtering is high-priced and control for forming a good-quality film is difficult. In addition, the sol-gel process requires a high burning temperature of 500° C. or more and thus is not easily accessible.

Furthermore, anti-fouling properties are required because automotive or building exterior materials can easily be contaminated by dust, exhaust gas, snow or rain.

However, the hard coating composition from prior arts often had no anti-fouling property, and since fluorine compound was added as an additive even if the anti-fouling property was present, the anti-fouling property did not persist as time went by.

As a method for imparting anti-fouling property, a water-repellent treatment method has also been used without adding a fluorine compound.

In the water-repelling treatment method, the surface of a material is coated with water-repellent wax to form a hydrophobic coating, thereby allowing rainwater or washing water to fall from the surface of the material to water droplets.

This method has an advantage that contaminants do not remain on the surface of the material, but are easily removed from the surface, even if the contaminants are contained in the rainwater or washing water.

However, the water-repellent treatment method forming a hydrophobic coating only temporarily imparts hydrophobicity, so that the hydrophobic effect is not maintained sufficiently and the hydrophobic coating is easily removed by rainwater or water for washing.

Therefore, there is a need for a composition for forming a hard coating layer capable of sustaining anti-fouling even after a lapse of time, having excellent scratch resistance and abrasion resistance, and capable of easily forming a hard coating layer.

BRIEF DESCRIPTION OF THE DRAWINGS

These and/or other aspects, features, and advantages of the invention will become apparent and more readily appreciated from the following description of embodiments, taken in conjunction with the accompanying drawings of which:

FIG. 2A shows a photograph at the start of evaluation (t=0), and FIG. 2B shows a photograph after completion of evaluation.

DETAILED DESCRIPTION OF THE INVENTION

Figure 1:
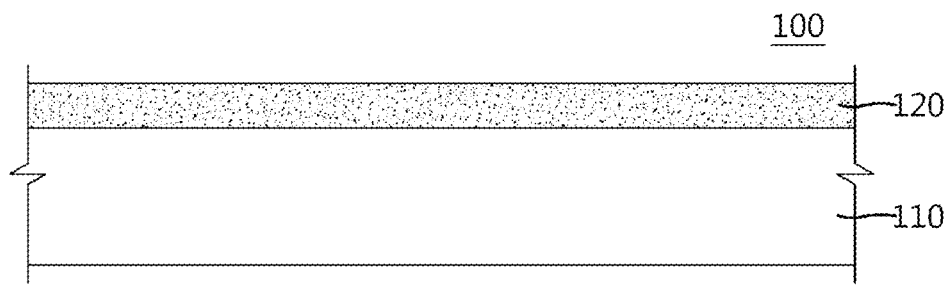
FIG. 1 is a sectional view of a hard coating film according to one embodiment of the present invention.

Example embodiments of the present disclosure will hereinafter be described in more detail, and may be easily performed by those who have knowledge in the related art. However, this disclosure may be embodied in many different forms, and should not be construed as being limited to the Example embodiments set forth herein.

Hereinafter, a hard coating composition for forming a hard coating layer according to an embodiment will be described in more detail.

The composition for forming a hard coating layer, comprising: (A) a polysilazane; (B) a reactive solvent containing hydroxyl group; (C) titanium dioxide ($TiO_2$); and (D) zirconia ($ZrO_2$). Details of each component of the composition for forming a hard coating layer are as follows:

(A) Polysilazane

A polysilazane can be used as a hard coating, an insulating film, a separator, and the like in that it can be converted into dense silica glass material by heating and oxidation reaction.

In one embodiment, the polysilazane includes a silicon-nitrogen (Si—N) bond unit represented by Chemical Formula 1.

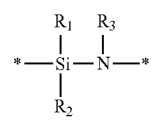

[Chemical Formula 1]

In Chemical Formula 1, $R_1$ to $R_3$ may each independently be hydrogen, a substituted or unsubstituted $C_1$ to $C_{30}$ alkyl group, a substituted or unsubstituted $C_3$ to $C_{30}$ cycloalkyl group, a substituted or unsubstituted $C_6$ to $C_{30}$ aryl group, a substituted or unsubstituted $C_7$ to $C_{30}$ arylalkyl group, a substituted or unsubstituted $C_1$ to $C_{30}$ heteroalkyl group, a substituted or unsubstituted $C_2$ to $C_{30}$ heterocycloalkyl group, a substituted or unsubstituted $C_2$ to $C_{30}$ alkenyl group, a substituted or unsubstituted alkoxy group, a carboxyl group, an aldehyde group, a hydroxy group, or a combination thereof, and "*" may indicate a linking point (e.g., coupling position).

As used herein, the term "substituted" means that at least one hydrogen atom is substituted with a halogen atom, a hydroxyl group, a nitro group, a cyano group, an amino group, an azido group, an amidino group, a hydrazino group, a carbonyl group, a carbamyl group, a thiol group, an ester group, a carboxyl group or a salt thereof, a sulfonic acid group or a salt thereof, a phosphate group or a salt thereof, a $C_1$ to $C_{20}$ alkyl group, a $C_2$ to $C_{20}$ alkenyl group, a $C_2$ to $C_{20}$ alkynyl group, a $C_1$ to $C_{20}$ alkoxy group, a $C_6$ to $C_{30}$ aryl group, a $C_6$ to $C_{30}$ aryloxy group, a $C_3$ to $C_{30}$ cycloalkyl group, a $C_3$ to $C_{30}$ cycloalkenyl group, a $C_3$ to $C_{30}$ cycloalkynyl group, or combinations thereof.

The polysilazane is transformed into dense silica glass by heating and oxidation. The polysilazane includes a silicon-nitrogen (Si—N) bond unit, a silicon-hydrogen (Si—H) bond unit, and a nitrogen-hydrogen (N—H) bond unit as a backbone. In the polysiloxazane, the (Si—N) bond can be substituted with a (Si—O) bond through baking or curing.

In one embodiment, the polysilazane has a terminal group represented by Chemical Formula 2.

*—SiH$_3$  [Chemical Formula 2]

The terminal group represented by Chemical Formula 2 may be included in an amount of about 15 wt % to about 35 wt % based on the total weight of Si—H bonds in the polysilazane. When the terminal group represented by Chemical Formula 2 is included in the polysilazane structure within this amount range, loss of the SiH$_3$ moiety via conversion into SiH$_4$ when an oxidation reaction occurs during heat treatment may be prevented or reduced, and cracks in a hard coating layer may be prevented.

For example, the terminal group represented by Chemical Formula 2 may be included in an amount of about 20 wt % to about 30 wt % based on the total weight of Si—H bonds in the polysilazane.

The polysilazane may have a weight average molecular weight (Mw) of about 1,000 g/mol to about 5,000 g/mol. Within this range, it is possible to reduce evaporation loss during heat treatment and to form a dense organic-inorganic hybrid layer by thin film coating. Preferably, the polysiloxazane has a weight average molecular weight (Mw) of about 1,500 g/mol to about 3,500 g/mol.

The polysilazane may be present in an amount of about 0.1 wt % to about 15 wt % based on the total amount of the composition for forming a hard coating layer. Within this range, it is possible to maintain proper viscosity, whereby the hard coating layer can have excellent weatherability and uniformly formed without bubbling or voids.

(B) Reactive Solvent Containing Hydroxyl Group

In the present invention, a reactive solvent containing hydroxyl group is used as a solvent.

By using the reactive solvent containing hydroxyl group capable of reacting with the polysilazane, the compatibility of the polysilazane can be achieved and the dispersibility of titanium dioxide can be achieved.

The reactive solvent containing hydroxyl group includes an alcohol-based solvent, a silanol-based solvent, an alkoxysilane-based solvent, or a combination thereof.

The alcohol-based solvent may be a $C_1$ to $C_{10}$ alcohol. Examples of the alcohol-based solvent include methanol, ethanol, n-butanol, octanol, and the like. These may be used alone or in combination thereof.

The silanol-based solvent may be trialkylsilanol having a substituted or unsubstituted $C_1$ to $C_{10}$ alkyl group. Examples of the silanol-based solvent include trimethylsilanol and triethylsilanol.

The alkoxysilane-based solvent is represented by Chemical Formula 3.

$R^4{}_xSi(OR^5)_{4-x}$  [Chemical Formula 3]

where $R^4$ is a $C_1$ to $C_{10}$ alkyl group, a $C_6$ to $C_{10}$ aryl group, or a $C_3$ to $C_{10}$ alkenyl group; $R^5$ is a $C_1$ to $C_6$ alkyl group; and x is an integer satisfying 0≤x<4.

The alkoxysilane solvent represented by Chemical Formula 3 may include at least one compound selected from the group consisting of tetramethoxysilane, tetraethoxysilane, tetrapropoxysilane, tetraisopropoxysilane, tetra-n-butoxysilane, tetra-sec-butoxysilane, tetra-tert-butoxysilane, trimethoxysilane, triethoxysilane, methyltrimethoxysilane, methyltriethoxysilane, ethyltrimethoxysilane, ethyltriethoxysilane, propyltrimethoxysilane, propyltriethoxysilane, isobutyltriethoxysilane, cyclohexyltrimethoxysilane, phenyltrimethoxysilane, phenyltriethoxysilane, vinyltrimethoxysilane, vinyltriethoxysilane, allyltrimethoxysilane allyltriethoxysilane, dimethyldimethoxysilane, dimethyldiethoxysilane, diphenyldimethoxysilane, diphenyldiethoxysilane, and combinations thereof, without being limited thereto.

In one embodiment, the reactive solvent containing hydroxyl group may be ethanol as alcohol-based solvent and/or tetraethoxysilane (TEOS) as alkoxysilane-based solvent, and the reactive solvent containing hydroxyl group comprising ethanol and tetraethoxysilane (TEOS may have the weight ratio of ethanol to tetraethoxysilane (TEOS) at about 1:0.001 to 1:0.5. Within this range, the hard coating film density of the polysilazane can be improved, and the coagulation of the titanium dioxide contained in the photocatalyst can be prevented.

The reactive solvent containing hydroxyl group may be present in an amount of about 55 wt % to about 94.6 wt % based on the total amount of the composition for forming a hard coating layer. Within this range, the reactive solvent reacts with the polysilazane to achieve the compatibility of the polysilazane, and the dispersibility of the titanium dioxide can be achieved.

(C) Titanium Dioxide

A titanium dioxide is a photocatalyst that absorbs irradiated light energy (hv) to generate electrons (e) in the conduction band (CB) and holes (h) in the valence band (VB) when irradiating near-ultraviolet light having a wavelength of about 387 nm or less.

The electron (e)-hole (h) pairs formed in the titanium dioxide recombine within a few seconds. When reacting with moisture ($H_2O$) and oxygen ($O_2$) in the air before recombination, water and oxygen are decomposed into OH radicals and $O_2$ radicals, respectively.

The photocatalytic degradation mechanism of the titanium dioxide can be represented by the following chemical reaction formula 1.

$$TiO_2 + hv(<387\ nm) \rightarrow e_{CB}^- + h_{VB}^+$$

$$H_2O + h_{VB}^+ \rightarrow \cdot OH + H^+$$

$$e_{CB}^- + O_2 \rightarrow O_2^-$$  [Chemical reaction formula 1]

The hole (h) and the OH radical generated through the photocatalytic decomposition of the chemical reaction formula 1 react with the organic material (R) to decompose the organic material (R) into carbon dioxide and water.

The organic decomposition mechanism can be represented by the following chemical reaction formula 2.

$$h_{VB}^+ + R \rightarrow intermediates \rightarrow CO_2 + H_2O$$

$$\cdot OH + R \rightarrow intermediates \rightarrow CO_2 + H_2O$$  [Chemical reaction formula 2]

The titanium dioxide may be a white powder having an average particle diameter (D50) of about 8 nm to about 15 nm. Within this range, the active surface area can be maximized and sufficient dispersibility can be achieved.

The titanium dioxide may be present in an amount of about 5 wt % to about 20 wt % based on the total amount of the composition for forming a hard coating layer.

When the content of the titanium dioxide is less than 5 wt %, the photocatalytic activity may be lowered, thus exhibiting poor properties in terms of the self-cleaning, antibacterial property, and superhydrophilicity. If the content of the titanium dioxide exceeds 20 wt %, the permeability and the weatherability may be deteriorated.

(D) Zirconia

A zirconia is a heat-resistant material with a high melting temperature (about 2,700° C.) and has excellent material properties such as low thermal conductivity, wide chemical resistance from acidic to alkaline, low thermal expansion and hardness.

The above-mentioned titanium dioxide must be firmly fixed on the binder to achieve an effective surface area.

Since titanium dioxide can be decomposed by an organic substance when the binder is an organic substance, the present inventors have introduced zirconia ($ZrO_2$) powder as an inorganic binder capable of addressing the issue with titanium dioxide.

In addition, zirconia may exhibit an effect of not only addressing the issue with titanium dioxide, but also improving the adhesion of the composition for forming a hard coating layer on the substrate.

Zirconia ($ZrO_2$) may be a powder having an average particle diameter (D50) of about 10 nm to about 25 nm.

Zirconia may be present in an amount of about 0.3 wt % to about 10 wt % based on the total amount of the composition for forming a hard coating layer. Within this range, the photocatalytic effect of the titanium dioxide can be improved without deteriorating the mechanical properties, and excellent adhesion with a substrate can be exhibited.

(E) Additives

The composition may include additives to enhance flow and process properties and stability. The additives may include, e.g., surfactants, thermal acid generators, dispersants, thixotropic agents, viscosity stabilizers, anti-foaming agents, pigments, UV stabilizers, antioxidants, coupling agents, etc. The additives may be used alone or as mixtures thereof.

The surfactant is not particularly limited, and may be, for example, a non-ionic surfactant such as a polyoxyethylene alkyl ether (such as polyoxyethylene lauryl ether, polyoxyethylene stearyl ether, polyoxyethylene cetyl ether, polyoxyethylene oleyl ether, and/or the like), a polyoxyethylene alkylallyl ether (such as polyoxyethylenenonyl phenol ether and/or the like), a polyoxyethylene.polyoxypropylene block copolymer, a polyoxyethylene sorbitan fatty acid ester (such as sorbitan monolaurate, sorbitan monopalmitate, sorbitan monostearate, sorbitan monoleate, polyoxyethylene sorbitan monostearate, polyoxyethylene sorbitan trioleate, polyoxyethylene sorbitan tristearate, and/or the like); a fluorine-based surfactant (such as EFTOP EF301, EF303, EF352 (Tochem Products Co., Ltd.), MEGAFACE F171, F173 (Dainippon Ink & Chem., Inc.), FLUORAD FC430, FC431 (Sumitomo 3M), AsahiGuard AG710, Surflon S-382, SC101, SC102, SC103, SC104, SC105, SC106 (Asahi Glass Co., Ltd.), and/or the like), and/or another silicone-based surfactant (such as a organosiloxane polymer KP341 (Shin-Etsu Chemical Co., Ltd.)), and/or the like.

The surfactant may be present in the composition in an amount of, e.g., about 0.001 wt % to about 5 wt %. Within this range, solution dispersion, and simultaneously, uniformity in the thickness of a layer may be improved.

The composition for forming a hard coating layer may further include a thermal acid generator (TAG).

The thermal acid generator may be an additive to improve the developing properties of the composition for forming a hard coating layer, and may thus enable the polymer of the composition to be developed at a relatively low temperature.

The thermal acid generator may include any compound that generates acid ($H^+$) upon heating, with no particular limitations. For example, it may include a compound that is activated at a temperature of about 90° C. or higher, generates sufficient acid, and has low volatility.

The thermal acid generator may be, for example, selected from nitrobenzyl tosylate, nitrobenzyl benzenesulfonate, phenol sulfonate, and combinations thereof.

The thermal acid generator may be included in an amount of about 0.01 wt % to about 5 wt % based on the total weight of the composition for forming a hard coating layer. When the amount of the thermal acid generator is within these ranges, the polymer may be developed at a low temperature and may simultaneously have improved hard coating properties.

In one embodiment, the composition for forming a hard coating layer may have a pH of 7 to 8. The photocatalytic activity of the titanium dioxide can be improved in the above pH range and the formed hard coating layer can exhibit superhydrophilicity.

Another aspect of the present invention relates to hard coating film. According to embodiments of the present invention, the hard coating film may include a substrate and at least one hard coating layer stacked on the substrate.

FIG. 1 is a sectional view of a hard coating film according to one embodiment of the present invention. Referring to FIG. 1, a hard coating film 100 according to this embodiment may include a substrate 110 and a hard coating layer 120 formed on one surface of the substrate 110.

The substrate 110 may include glass, plastic, metal, fabric, and the like, without being limited thereto.

The hard coating layer 120 is formed from the composition for forming a hard coating layer described above.

According to one embodiment of the invention, a method of preparing a hard coating film may include: forming a coating layer by coating the composition for forming a hard coating layer onto one surface of a substrate; and performing curing process of the coating layer.

First, the composition for forming a hard coating layer is coated onto a substrate. The composition for forming a hard coating layer may be coated by roll coating, spin coating, bar coating, dip coating, flow coating, and/or spray coating, without being limited thereto. The composition for forming a hard coating layer may be coated to a thickness from about 300 nm to about 800 nm.

Curing process is performed by room-temperature curing or UV curing.

Room-temperature curing is performed by drying at about 20° C. to about 30° C. for about 1 minute to about 5 minutes. The hard coating layer is formed by a wet process, thereby reducing production time while improving process efficiency.

UV curing is a process carried out to lower the bonding energy at the silicon-nitrogen (Si—N), silicon-hydrogen (Si—H) or nitrogen-hydrogen (N—H) bond of the polysilazane in the composition for forming a hard coating layer or to break the bond.

When UV curing is performed in this way, the conversion to silica can be further improved. UV curing may be performed by, for example, vacuum UV treatment. Specifically, for vacuum UV irradiation, UV light at a wavelength of about 100 nm to about 200 nm may be used under vacuum conditions. In vacuum UV irradiation, irradiance and radiant exposure of UV light may be suitably adjusted. In one embodiment, vacuum UV irradiation may be performed at an irradiance of about 10 mW/cm$^2$ to about 200 mW/cm$^2$ and at a radiant exposure of about 100 mJ/cm$^2$ to about 6,000 mJ/cm$^2$, for example, about 1,000 mJ/cm$^2$ to about 5,000 mJ/cm$^2$. For example, vacuum UV irradiation may be performed for about 0.1 to 5 minutes.

The hard coating film of the present invention can be self-cleaned due to the photocatalytic decomposition of titanium dioxide contained in the hard coating layer, so that the anti-fouling property is excellent. Further, the hard coating film of the present invention has antibacterial properties due to the high oxidation-reduction power as described above.

Generally, the superhydrophilicity of titanium dioxide is difficult to exhibit its characteristics when the light source disappears. However, since the hard coating layer of the present invention functions as a silica carrier capable of supporting water derived from the polysilazane, the hard coating layer of the present invention can maintain a superhydrophilicity even after the light source disappears.

Therefore, when the composition for forming a hard coating layer according to the present invention is used on a glass substrate such as an automobile windshield, a side mirror, a bathroom, etc., excellent superhydrophilicity can be exhibited.

In particular, the composition for forming a hard coating layer of the present invention is excellent in adhesion of a hard coating layer to a substrate and is excellent in abrasion resistance, scratch resistance, weatherability, and the like, and thus is preferably used for a vehicle or building windows.

The hard coating layer formed from the composition of the present invention may have a pencil hardness of 7H or more, particularly 7H to 9H. Within this range, excellent scratch resistance and abrasion resistance can be obtained.

The hard coating layer formed from the composition of the present invention may have a water contact angle of 5° or less, particularly 3° or less. Within this range, excellent superhydrophilicity can be obtained.

The hard coating layer formed from the composition of the present invention has a color difference value (ΔE) of 0.3 or less in accordance with ASTM D-4587. Within this range, excellent weatherability can be obtained.

Mode for Invention

Hereinafter, the present invention will be described in more detail with reference to some examples. However, it should be understood that these examples are provided for illustration only and are not to be construed in any way as limiting the present invention. A description of details apparent to those skilled in the art will be omitted for clarity.

Preparation of Composition for Forming Hard Coating Layer

EXAMPLE 1

Into a 2 L reactor provided with an agitator and a temperature controller, the inner atmosphere of which was previously replaced with dried nitrogen, a mixture obtained by sufficiently mixing 1,500 g of dried pyridine and 2.0 g of pure water was placed and maintained at 5° C. Then, 100 g of dichlorosilane was slowly introduced into the reactor for 1 hour, followed by stirring while slowly introducing 70 g of ammonia into the reactor over the course of 3 hours. Thereafter, the reactor was purged with dried nitrogen for 30 minutes to remove residual ammonia from the reactor. The obtained product had a white slurry phase and was filtered under a dried nitrogen atmosphere using a Teflon membrane filter having a pore size of 1 μm, thereby obtaining 1,000 g of filtrate. After 1,000 g of dried xylene was added to the filtrate, an operation of substituting xylene for pyridine, as a solvent, was performed three times using a rotary evaporator to adjust a solid content to 20%, followed by filtration through a Teflon membrane filter having a pore size of 0.03 μm, thereby preparing a polysilazane. The obtained polysilazane contained 0.5% of oxygen and had a SiH$_3$/SiH (total) value of 0.20 and a weight average molecular weight of 2,000 g/mol.

As a reactive solvent, 87 wt % of ethanol and 0.5 wt % of tetraethoxysilane (TEOS) are added into 2 wt % of the obtained polysilazane, and the mixture is stirred for 2 hours. The mixture is stirred at 180 rpm for the first hour and then at 90 rpm. After stirring the polysilazane and the reactive solvent, 10 wt % of the titanium dioxide (TiO$_2$) having an average particle diameter (D50) of 10 nm and 0.5 wt % of the zirconia (ZrO$_2$) having an average particle diameter (D50) of 25 nm are added thereto and stirred for 2 hours to obtain a composition for forming a hard coating layer.

The prepared composition for forming a hard coating layer is roll-coated on a polycarbonate substrate having a thickness of 3 mm to a thickness of 300 nm and then cured at room temperature for 5 minutes to prepare a hard coating film.

The prepared hard coating film is evaluated as to the following properties and results are shown in Table 1.

EXAMPLE 2

A hard coating film is prepared in the same manner as in Example 1 except that the composition for forming a hard coating layer is prepared with the wt % composition shown in Table 1. The prepared hard coating film is evaluated as to the following properties and results are shown in Table 1.

COMPARATIVE EXAMPLE 1

A hard coating film is prepared in the same manner as in Example 1 except that the composition for forming a hard coating layer is prepared with the wt % composition shown in the Table 1. The prepared hard coating film is evaluated as to the following properties and results are shown in Table 1.

TABLE 1

|  | Item |  | EXAMPLE 1 | EXAMPLE 2 | COMP. EXAMPLE 1 |
|---|---|---|---|---|---|
| Composition (wt %) | (A) Polysilazane |  | 2 | 2 | 2 |
|  | (B) Solvent | (b1)Ethanol | 87 | 87.5 | — |
|  |  | (b2)TEOS | 0.5 | — | — |
|  |  | (b3)Hexane | — | — | 98 |
|  | (C) Titanium dioxide |  | 10 | 10 | — |
|  | (D) Zirconia |  | 0.5 | 0.5 | — |
| Properties | Pencil hardness |  | 9H | 7H | 1H |
|  | Water contact angle |  | 3° | 3° | 7° |
|  | ΔE |  | 0.3 | 0.3 | 1.5 |
|  | Antibacterial test |  | ND | ND | 8,000 CFU/ml |

As shown in Table 1, it can be seen that the hard coating layer prepared according to Examples 1 and 2 of the present invention exhibit excellent properties in terms of hardness, superhydrophilicity with a water contact angle of 5° or less, weatherability, and antibacterial property.

In comparison, it was found that the hard coating layer prepared according to Comparative Examples 1 exhibits poor properties in terms of hardness, superhydrophilicity, weatherability, and antibacterial property.

Evaluation of Properties

Pencil hardness: Pencil hardness is measured using a HEIDON-14EW instrument from SHINTO Scientific. (pencil: MITSUBISHI Co., speed: 60 mm/min, scale: 10.0 mm, force: 19.6N, the load: 1 kg, angle: 45°)

Water drop test: Using an automatic contact angle meter DM700 (manufactured by Kyowa Interface Science Co., Ltd.), 2 μℓ of pure water is dropped on the hard coating layer to measure the water contact angle.

Accelerated weatherability test: The color difference value (ΔE) of the hard coating film prepared in accordance with ASTM D-4587 is measured. ΔE is measured by quantifying the degree of discoloration of the hard coating film before and after exposure to ultraviolet light after exposing the hard coating film to ultraviolet light (UV) for 2,000 hours.

Antibacterial test: The hard coating film prepared according to the examples is put into 1 L of a solution containing 4,000 CFU/ml of *Escherichia coli*, and the number of *E. coli* cells after 24 hours is measured. *Escherichia coli* was measured 24 hours after the solution containing only *Escherichia coli* as a control group, and the number of *Escherichia coli* in the control group after 24 hours was 8,000 CFU/ml.

Evaluation 1: Self-cleaning Test

The composition for forming a hard coating layer of Example 1 is coated on one surface of a fabric substrate, thereby forming a 300 nm thick hard coating layer. A stamp ink is printed onto the hard coating layer as a contaminant. The solar light is irradiated on the surface of hard coating layer for 3 minutes and then self-cleaning is evaluated.

Figure 2A:
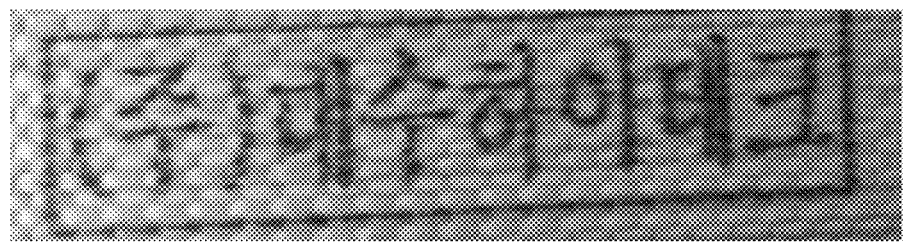
FIGS. 2A and 2B illustrate a self-cleaning test.
Figure 2B:
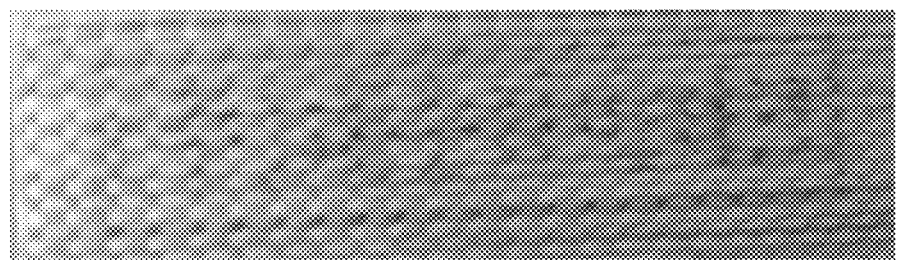

FIG. 2 (*a*) shows a photograph at the start of evaluation (t=0), and FIG. 2 (*b*) shows a photograph after completion of evaluation.

It can be seen from the photograph that the composition for forming a hard coating layer of the present invention has excellent self-cleaning ability.

Evaluation 2: Anti-fouling Test

The composition for forming a hard coating layer of Example 1 is coated on a part surface of a polyvinyl chloride (PVC) substrate, thereby forming a 300 nm thick hard coating layer, and allowed to stand outdoors for 14 months, and the water contact angle of the hard coating layer was measured over time.

Figure 3:
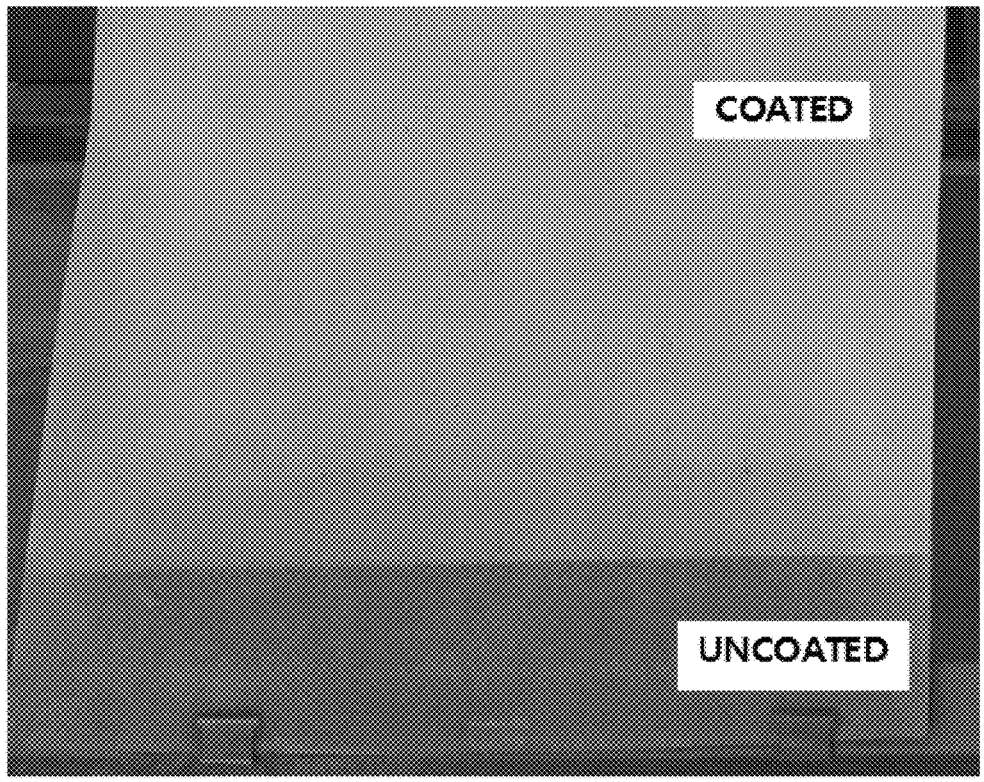
FIG. 3 is a photograph of the PVC substrate after the anti-fouling test.

Table 2 shows the result of measuring the water contact angle of droplets of the hard coating layer with time after outdoor exposure, and FIG. 3 is a photograph of the PVC substrate after the anti-fouling test.

TABLE 2

| time (months) | 1 | 3 | 6 | 9 | 12 | 14 |
|---|---|---|---|---|---|---|
| water contact angle (°) | 3 | 3 | 3 | 3 | 3 | 3 |

As shown in Table 2, the hard coating layer coated with the composition of the present invention maintains the water contact angle of 5° or less even when exposed to the external environment for a long time. As can be seen from FIG. 3, the hard coating layer coated with the composition of the present invention shows that the contaminants are remarkably reduced as compared with the uncoated region, thus it is visually confirmed that the hard coat layer has excellent anti-fouling properties.

Evaluation 3: Weatherability Test

The composition for forming a hard coating layer of Example 1 and Comparative example 1 are each coated on one surface of a polyvinyl chloride (PVC) substrate, thereby forming a 300 nm thick hard coating layer, and the prepared hard coating films are placed in a QUV accelerated weatherability tester and the yellowing phenomenon of the hard coating film under the following extreme conditions is visually observed. (cycle: 8 hours, light intensity: 0.77 W/m$^2$ (λ=340 nm), temperature: 60±3° C., humidity: 50±5° C.).

Figures 5, 6:
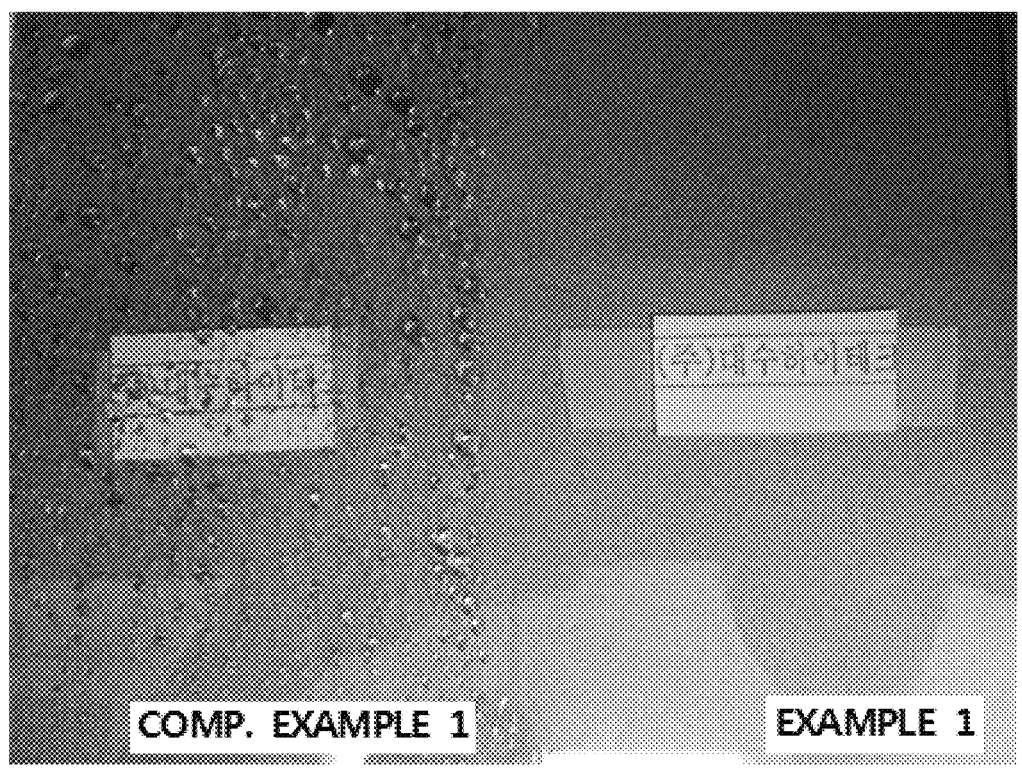
FIG. 5 is a photograph taken after the superhydrophilicity test.
FIG. 6 are photographs of the hard coating film taken over time.

FIG. 6 shows photographs of the hard coating film taken over time.

As shown in FIG. 6, the hard coating film prepared from the composition of Example 1 is visually excellent in weatherability as compared with the hard coating film prepared by the composition of Comparative Example 1.

Evaluation 4: Superhydrophilicity Test

The composition for forming a hard coating layer of Example 1 is coated on a part of a car side mirror, thereby forming a 300 nm thick hard coating layer, and water is sprayed to evaluate superhydrophilicity by whether water droplets are formed.

Figure 4:
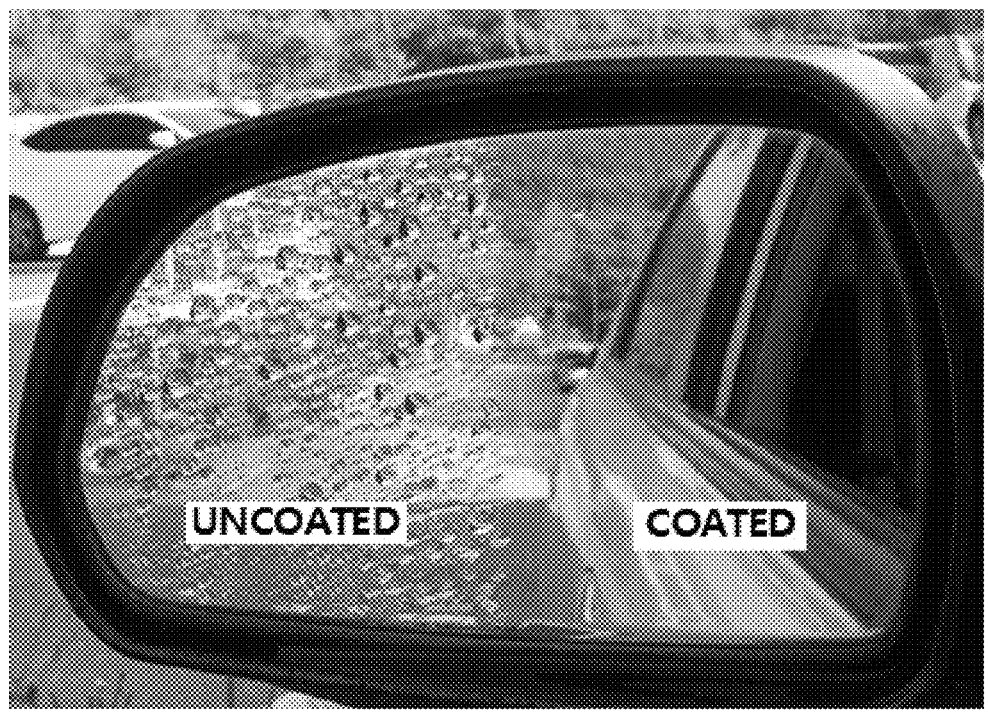
FIG. 4 is a photograph of a car side mirror after completion of the superhydrophilicity test.

FIG. 4 is a photograph of a car side mirror after completion of the superhydrophilicity test. As can be seen from FIG. 4, the hard coating layer coated with the composition of the present invention is remarkably excellent in hydrophilicity compared to the uncoated region, and thus it can be confirmed that water droplets are not formed.

Evaluation 5: Superhydrophilicity Test in the Lightless Region

The composition for forming a hard coating layer of Example 1 and Comparative example 1 are each coated on one surface of a polycarbonate substrate, thereby forming a 300 nm thick hard coating layer, and the prepared hard coating film is allowed to stand in a dark room for 48 hours and sprayed with water to evaluate superhydrophilicity by whether water droplets are formed.

FIG. 5 is a photograph taken after the superhydrophilicity test. As can be seen from FIG. 5, the hard coating layer coated with the composition of the present invention is excellent in superhydrophilicity even in the lightless region, and can exhibit excellent anti-fouling properties even in the cloudy weatherability and night time with reduced light.

While this present disclosure has been described in connection with what is presently considered to be practical Example embodiments, it is to be understood that the present disclosure is not limited to the disclosed embodiments, but, on the contrary, is intended to cover various modifications and equivalent arrangements included within the spirit and scope of the appended claims and equivalents thereof.

What is claimed is:

1. A composition for forming a hard coating layer, comprising:
   about 2 wt % of a polysilazane;
   about 87.5 wt % of a reactive solvent containing hydroxyl group;
   about 10 wt % of a titanium dioxide ($TiO_2$); and
   about 0.5 wt % of a zirconia ($ZrO_2$).

2. The composition for forming a hard coating layer according to claim 1,
   the polysilazane includes a silicon-nitrogen (Si—N) bond unit represented by Chemical Formula 1:

[Chemical Formula 1]

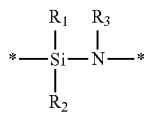

wherein, in Chemical Formula 1, $R_1$ to $R_3$ may each independently be hydrogen, a substituted or unsubstituted $C_1$ to $C_{30}$ alkyl group, a substituted or unsubstituted $C_3$ to $C_{30}$ cycloalkyl group, a substituted or unsubstituted $C_6$ to $C_{30}$ aryl group, a substituted or unsubstituted $C_7$ to $C_{30}$ arylalkyl group, a substituted or unsubstituted $C_1$ to $C_{30}$ heteroalkyl group, a substituted or unsubstituted $C_2$ to $C_{30}$ heterocycloalkyl group, a substituted or unsubstituted $C_2$ to $C_{30}$ alkenyl group, a substituted or unsubstituted alkoxy group, a carboxyl group, an aldehyde group, a hydroxy group, or a combination thereof.

3. The composition for forming a hard coating layer according to claim 1,
   wherein the reactive solvent containing hydroxyl group is an alcohol-based solvent, a silanol-based solvent, an alkoxysilane-based solvent, or a combination thereof.

4. The composition for forming a hard coating layer according to claim 3,
   wherein the reactive group-containing reactive solvent comprises ethanol and tetraethoxysilane (TEOS), and
   wherein the weight ratio of ethanol to tetraethoxysilane (TEOS) is about 1:0.001 to about 1:0.5.

5. The composition for forming a hard coating layer according to claim 1,
   the titanium dioxide ($TiO_2$) has an average particle diameter (D50) of about 8 nm to 15 nm, and
   the zirconia ($ZrO_2$) has an average particle diameter (D50) of about 10 nm to 25 nm.

6. A hard coating film comprising:
   a substrate; and a hard coating layer formed on the substrate,
   wherein the hard coating layer is formed from the composition of claims 1,
   wherein the hard coating layer has a thickness from about 300 nm to about 800 nm.

7. The hard coating film according to claim 6,
   wherein the hard coating film has a pencil hardness from about 7H to about 9H, and has a water contact angle of 5° or less.

8. The hard coating film according to claim 7,
   wherein the hard coating film has a color difference value (ΔE) of 0.3 or less as measured in accordance with ASTM D-4587.

* * * * *